(12) United States Patent
Wessel et al.

(10) Patent No.: US 10,068,593 B1
(45) Date of Patent: Sep. 4, 2018

(54) BOLOMETER WITH LOW SCATTERING FOR A HEAT-ASSISTED MAGNETIC RECORDING SLIDER

(71) Applicant: Seagate Technology LLC, Cupertino, CA (US)

(72) Inventors: James Gary Wessel, Savage, MN (US); Chen Wang, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/867,331

(22) Filed: Jan. 10, 2018

Related U.S. Application Data (63) Continuation of application No. 15/491,592, filed on Apr. 19, 2017, now Pat. No. 9,870,787.

(51) Int. Cl.
| | |
|---|---|
| *G11B 27/36* | (2006.01) |
| *G11B 5/31* | (2006.01) |
| *G11B 5/48* | (2006.01) |
| *G01J 5/10* | (2006.01) |
| *G01J 5/08* | (2006.01) |
| *G11B 5/00* | (2006.01) |

(52) U.S. Cl.
CPC ............ *G11B 5/314* (2013.01); *G01J 5/0818* (2013.01); *G01J 5/10* (2013.01); *G11B 5/4866* (2013.01); *G11B 2005/0021* (2013.01)

(58) Field of Classification Search
CPC ... G11B 4/4866; G11B 2005/21; G11B 5/314; G11B 2005/0005; G11B 2005/0021; G11B 5/4886; G11B 5/3803; G11B 5/607; G11B 5/6094; G11B 33/1406; G11B 5/40; G11B 5/4853; G11B 11/1051; G11B 11/10506
USPC .......... 360/328, 59; 369/13.13, 13.14, 13.33, 369/13.34
See application file for complete search history.

(56) References Cited

U.S. PATENT DOCUMENTS

| | | | |
|---|---|---|---|
| 8,349,605 B1 * | 1/2013 | Lear | G01N 21/552 385/5 |
| 8,824,085 B2 | 9/2014 | Wilson et al. | |
| 9,153,272 B1 | 10/2015 | Rausch et al. | |
| 9,236,081 B1 | 1/2016 | Chu et al. | |
| 9,355,671 B2 | 5/2016 | Rausch et al. | |
| 9,595,288 B1 | 3/2017 | Chu et al. | |
| 2011/0299367 A1 | 12/2011 | Naniwa et al. | |

(Continued)

*Primary Examiner* — Nabil Hindi
(74) *Attorney, Agent, or Firm* — Hollingsworth Davis, LLC (57) ABSTRACT

A slider configured for heat-assisted magnetic recording has an upper surface, an opposing air bearing surface (ABS), and a body defined between the upper surface and the ABS. The slider comprises a write pole and a near-field transducer (NFT) at or near the ABS. An optical waveguide is configured to receive light from a laser source and comprises a first cladding layer, a second cladding layer, and a core between the first and second cladding layers. The core has a width, a length, and a longitudinal axis oriented along the length of the core. A bolometer is situated within the body of the slider at a location that receives at least some of the light communicated along the waveguide used during a writing operation. The bolometer is spaced apart from the core and comprises a longitudinal axis that is oriented substantially parallel to the longitudinal axis of the core.

20 Claims, 12 Drawing Sheets

(56) References Cited

U.S. PATENT DOCUMENTS

| | | |
|---|---|---|
| 2012/0051196 A1 | 3/2012 | Grobis et al. |
| 2014/0119164 A1 | 5/2014 | Wilson et al. |
| 2014/0269238 A1 | 9/2014 | Kautzky et al. |
| 2015/0279430 A1 | 10/2015 | Trantham et al. |
| 2015/0332725 A1 | 11/2015 | Rausch et al. |
| 2016/0104514 A1 | 4/2016 | Burnett et al. |
| 2016/0284372 A1 | 9/2016 | Duda et al. |

\* cited by examiner

BOLOMETER WITH LOW SCATTERING FOR A HEAT-ASSISTED MAGNETIC RECORDING SLIDER

RELATED PATENT DOCUMENTS

This application claims is a continuation of U.S. application Ser. No. 15/491,592 filed on Apr. 19, 2017, which is incorporated herein by reference in its entirety.

SUMMARY

Embodiments of the disclosure are directed to an apparatus comprising a slider configured for heat-assisted magnetic recording. The slider has an upper surface, an opposing air bearing surface (ABS), and a body defined between the upper surface and the ABS. The slider comprises a write pole at or near the ABS and a near-field transducer (NFT) at or near the ABS and proximate the write pole. An optical waveguide is configured to receive light from a laser source and comprises a first cladding layer, a second cladding layer, and a core between the first and second cladding layers. The core has a width, a length extending between the upper surface of the slider and the NFT, and a longitudinal axis oriented along the length of the core. A bolometer is situated within the body of the slider at a location that receives at least some of the light communicated along the waveguide used during a writing operation. The bolometer is spaced apart from the core and comprises a longitudinal axis oriented substantially parallel to the longitudinal axis of the core.

Other embodiments are directed to an apparatus comprising a slider configured for heat-assisted magnetic recording. The slider has an upper surface, an opposing ABS, and a body defined between the upper surface and the ABS. The slider comprises a write pole at or near the ABS and an NFT at or near the ABS and proximate the write pole. An optical waveguide is configured to receive light from a laser source and comprises a first cladding layer, a second cladding layer, and a core between the first and second cladding layers. The core has a width and a length extending between the upper surface of the slider and the NFT. A bolometer is situated within the body of the slider at a location that receives at least some of the light communicated along the waveguide used during a writing operation. The bolometer is spaced apart from the core so as not to extend across the width of the core.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to heat-assisted magnetic recording, which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR slider, sometimes referred to as a read/write element, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole.

The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature having dimensions less than 100 nm (e.g., ~50 nm).

Figure 1:
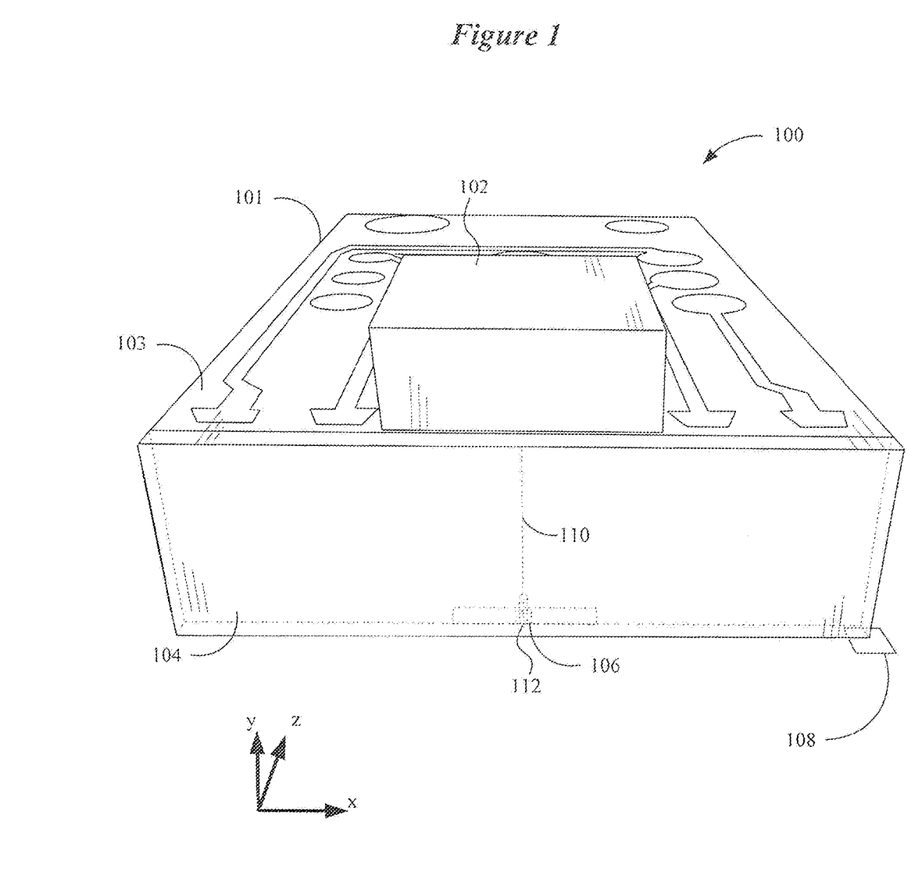
FIG. 1 is a perspective view of a slider assembly configured for heat-assisted magnetic recording (HAMR) according to a representative embodiment.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide system 110, are formed integrally within the slider body 101 (near a trailing edge surface 104 in this example) and function as an optical path that delivers energy from the laser diode 102 to the recording media via an NFT 112. The NFT 112 is near the writer of the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
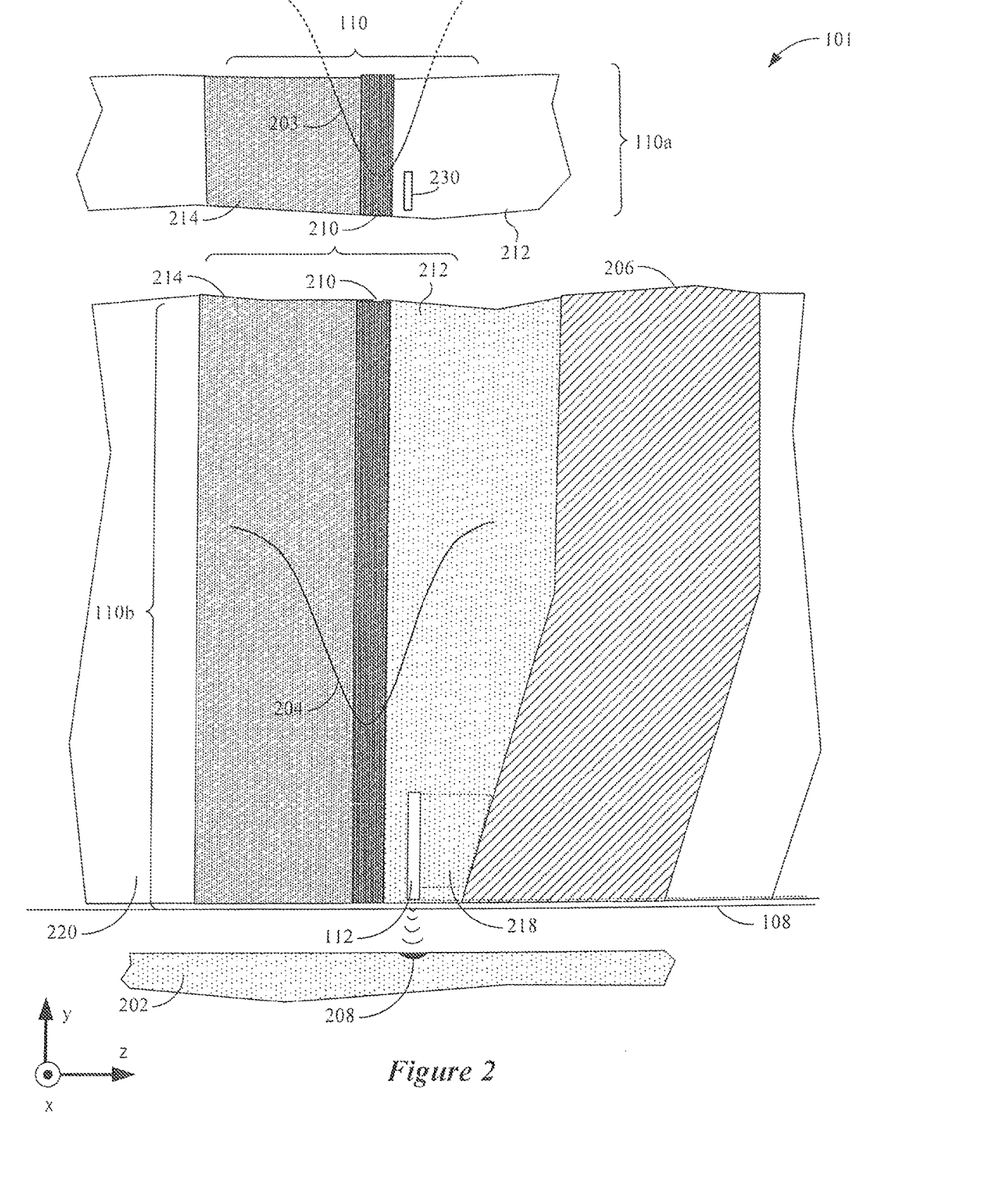
FIG. 2 is a cross-sectional view of portions of a slider body near an NFT according to a representative embodiment.

In FIG. 2, a cross-sectional view illustrates portions of the slider body 101 near the NFT 112 according to a representative embodiment. In this view, the NFT 112 is shown proximate to a surface of a magnetic recording medium 202, e.g., a magnetic disk. The waveguide system 110 delivers electromagnetic energy to the NFT 112, which directs the energy to create a small hotspot 208 on the recording medium 202. A magnetic write pole 206 causes changes in magnetic flux near the media facing surface 108 in response to an applied current. Flux from the write pole 206 changes a magnetic orientation of the hotspot 208 as it moves past the write pole 206 in the downtrack direction (z-direction).

According to some embodiments, the waveguide system 110 includes a first portion 110a configured to receive light 203 from a light source (e.g., laser 102 in FIG. 2) at a fundamental transverse electric (TE) mode (e.g., TE00). The first portion 110a may include at least a three-dimensional waveguide extending along the light propagation direction (negative y-direction). The waveguide system 110 also includes a second portion 110b that outputs light 204 to an output region of the waveguide near the NFT 112 at a higher-order TE mode (e.g., TE10). A mode order converter can be integrated in the first or second portions 110a and 110b. Alternatively, the dimensions and relative orientation of the portions 110a-b can be selected to achieve the mode conversion of light propagated to the NFT 112. The NFT 112 receives the light 204 at the higher-order mode and generates surface plasmons that heat the magnetic recording medium 202. The NFT 112 may include or be coupled to a heat sink 218 that extends to the write pole 206.

The waveguide portions 110a-b are formed via a layer of core material 210 surrounded by cladding layers 212 and 214. The core layer 210 and cladding layers 212, 214 may be made from dielectric materials such as Al2O3, SiOxNy, SiO2, Ta2O5, TiO2, ZnS, SiNx, Nb2O5, AlN, Hf2O3, Y2O3, etc. Generally, the dielectric materials are selected so that the refractive index of the core layer 210 is higher than refractive indices of the cladding layers 212 and 214. This arrangement of materials facilitates efficient propagation of light through the waveguide system 110. While the first and second portions 110a-b are co-planar in this example, they may be offset from each other in the z-direction. For example, the cores may have different thicknesses but be centrally aligned in the z-direction. In such a case, they may be formed from different core and/or cladding layers using the same or different materials.

In the embodiment shown in FIG. 2, the slider body 101 incorporates a bolometer 230 within the waveguide 110. As shown, the bolometer 230 is situated in the cladding layer 212 spaced apart laterally and vertically from the core layer 210. The bolometer 230 is situated in proximity to the core material 210 such that the bolometer 230 absorbs a small amount of light that is communicated along the waveguide system 110 and used during a write operation. The bolometer 230 is shaped and oriented to reduce scattering losses and significantly reduce reflection back to the laser source.

Figure 3:
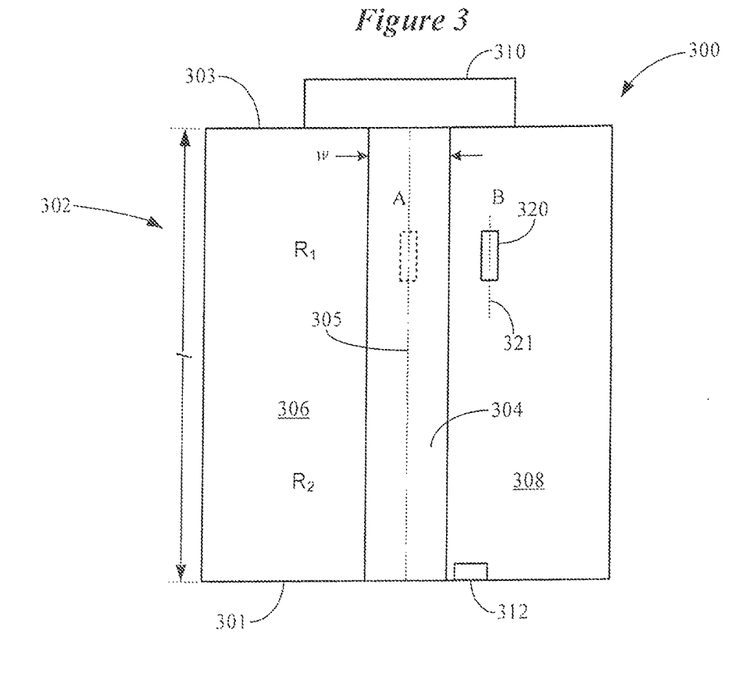
FIG. 3 shows a portion of a HAMR slider that includes a bolometer situated near or within an optical waveguide in accordance with various embodiments.

FIG. 3 shows a portion of a HAMR slider 300 that includes a bolometer 320 situated near or within an optical waveguide 302 in accordance with various embodiments. The waveguide 302 is configured to receive light from a laser source 310 situated at an upper surface 303 of the slider 300. The waveguide 302 communicates the light from the laser source 310 to an NFT 312 situated at or near an ABS 301 of the slider 300. The waveguide 302 extends between the upper surface 303 and the ABS 301 (e.g., extending to at least the NFT 312). The waveguide 302 includes a first cladding layer 306, a second cladding layer 308, and a core 304 disposed between the first and second cladding layers 306 and 308. The core 304 has a width, w, and a length, l, extending between the upper surface 303 and the NFT 312. The core has a longitudinal axis 305 oriented along the length, l, of the core 304. The width, w, of the core 304 can range between about 0.2 and 2 μm, and the length, l, of the core 304 can range between about 50 and 250 μm.

The bolometer 320 is situated within the body of the slider 300 at a location that receives at least some of the light communicated along the waveguide 302 used during a writing operation. The bolometer 320 is spaced apart from the core 304 at least in a vertical direction. In some embodiments, the bolometer 320 is spaced apart vertically and horizontally from the core 304 (see location A). In other embodiments, the bolometer 320 is spaced vertically from the core 304 but situated within the width dimension, w, of the core 304 (see location B). At location B, for example, the bolometer 320 is spaced above a centerline (shown as longitudinal axis 305) of the core 304.

The bolometer 320 shown in FIG. 3 has a longitudinal axis 321 that is oriented substantially parallel to the longitudinal axis 305 of the core 304. Orienting the bolometer 320 as shown in FIG. 3 minimizes reflection of light back to the laser source 310. For example, the bolometer 320 has a width dimension that is significantly smaller than its length dimension. By orienting the length dimension to be substantially parallel with the longitudinal axis 305 of the core 304, the cross-sectional area of the bolometer 320 that can cause back reflection to the laser source 310 is minimized. In some embodiments, the longitudinal axis 321 of the bolometer 320 can be oriented at an angle oblique to the longitudinal axis 305 of the core 304 (e.g., an angle of ~5-45'). Irrespective of its orientation, the bolometer 320 is preferably situated within the waveguide 302 such that the bolometer 320 does not extend across the width, w, of the core 304.

It can be appreciated that a conventional bolometer arrangement that extends across the width, w, of the core 304 acts as a mirror and can reflect up to 50% of incident light. The resulting back-reflection to the laser source 310 can cause laser diode instability, which can result in deleterious laser mode hopping. A bolometer 320 implemented in accordance with embodiments of the disclosure can provide for a ten-fold or more reduction in back-reflection in comparison to a conventional bolometer arrangement.

According to some embodiments, the waveguide 302 includes a first region, $R_1$, proximate the laser source 310 and a second region, $R_2$, proximate the ABS 301. The first region, $R_1$, can be configured as a lower-mode order section of the waveguide 302 (e.g., a TE00 mode section). The second region, $R_2$, can be configured as a higher-mode order section of the waveguide 302 (e.g., a TE10 mode section). According to various embodiments, the bolometer 320 is situated within the lower-mode order section of region $R_1$. For example, the bolometer 320 can be situated in region $R_1$ and spaced apart from the laser source 310 by a distance of less than about 60 μm (e.g., ~55 μm). In other embodiments, the bolometer 320 is situated within the higher-mode order section of region $R_2$. It is noted that the bolometer 320 is less susceptible to scattering when situated within the lower-mode order section of region $R_1$ in comparison to being situated within the higher-mode order section of region $R_2$. However, the bolometer 320 operates effectively in either of the regions $R_1$ and $R_2$ and with any mode.

Figure 4:
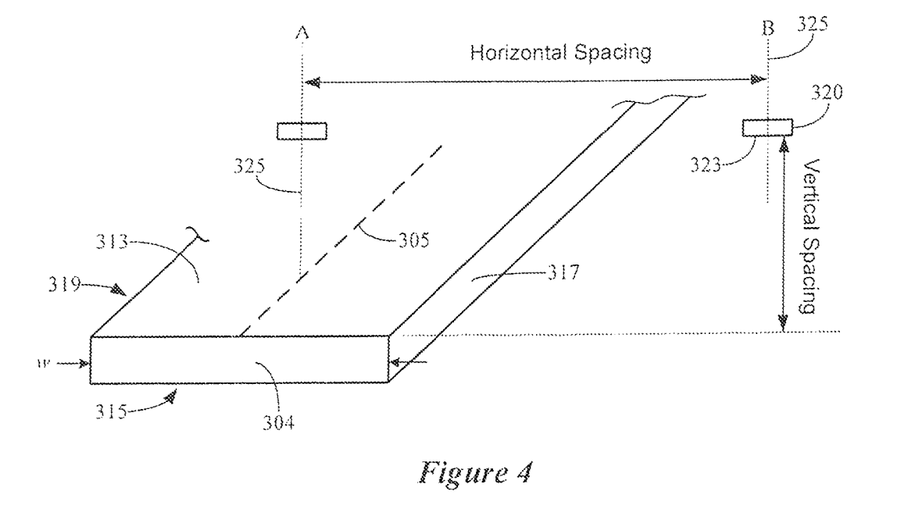
FIG. 4 shows additional details concerning the location of the bolometer relative to a core of the waveguide shown in FIG. 3.

FIG. 4 shows additional details concerning the location of the bolometer 320 relative to the core 304 of the waveguide 302 shown in FIG. 3. For purposes of explanation, the core 304 includes a first major surface 313 and a second major surface 315 opposing the first major surface 313. The core 304 also includes a first side surface 317 and a second side surface 319 opposing the first side surface 317. In FIG. 4, the bolometer 320 is shown at two different locations, A and B, relative to the core 304. The bolometer 320 has a vertical spacing relative to the first major surface 313, and a horizontal spacing relative to the longitudinal axis 305 of the core 304. The vertical spacing refers to the spacing between the first major surface 313 and a bottom surface 323 of the bolometer 320. The horizontal spacing refers to the spacing between the longitudinal axis 305 and a vertical centerline 325 of the bolometer 320. As shown, the longitudinal axis 305 represents the axial centerline (e.g., at w/2) of the core 304. Accordingly, the horizontal spacing represents center-to-center spacing between the core 304 and the bolometer 320.

According to some embodiments, the bolometer 320 is offset from the core 304 by a horizontal spacing and the vertical spacing such that no portion of the bolometer 320 overlaps with the core 304. This positional relationship between the bolometer 320 and the core 304 is shown as location A of the bolometer 320 in FIG. 4. According to other embodiments, the bolometer 320 is offset from the core 304 by a horizontal spacing and a vertical spacing such that the entire bolometer 320 overlaps with the core 304 and does not extend across a width of the core 304. This positional relationship between the bolometer 320 and the core 304 is shown as location B of the bolometer 320 in FIG. 4. According to further embodiments (not shown in FIG. 4), the bolometer 320 is offset from the core 304 by a horizontal spacing and a vertical spacing such that at least a portion of the bolometer 320 overlaps with the core 304. This positional relationship between the bolometer 320 and the core 304 can occur near the first and second end surfaces 317 and 319 of the core 304.

According to various embodiments, the horizontal spacing can range between about 0 and 500 nm. For example, the horizontal spacing can range between about 0 and w/2 nm, where w is the width of the core 304 (e.g., 0 and 400 nm). By way of further example, the horizontal spacing can range between about w/2 nm and 500 nm (e.g., 200-400 nm). The vertical spacing can range between about 100 and 300 nm (e.g., 150-250 nm).

The bolometer 320 is situated within the body of the slider 300. For example, the bolometer 320 can be situated within a cladding layer (upper or lower cladding layer) of the waveguide or other dielectric material (e.g., alumina) of the slider body. In some embodiments, the bolometer 320 can be situated within silica to protect the cladding layer or other surrounding dielectric material.

Figure 5:
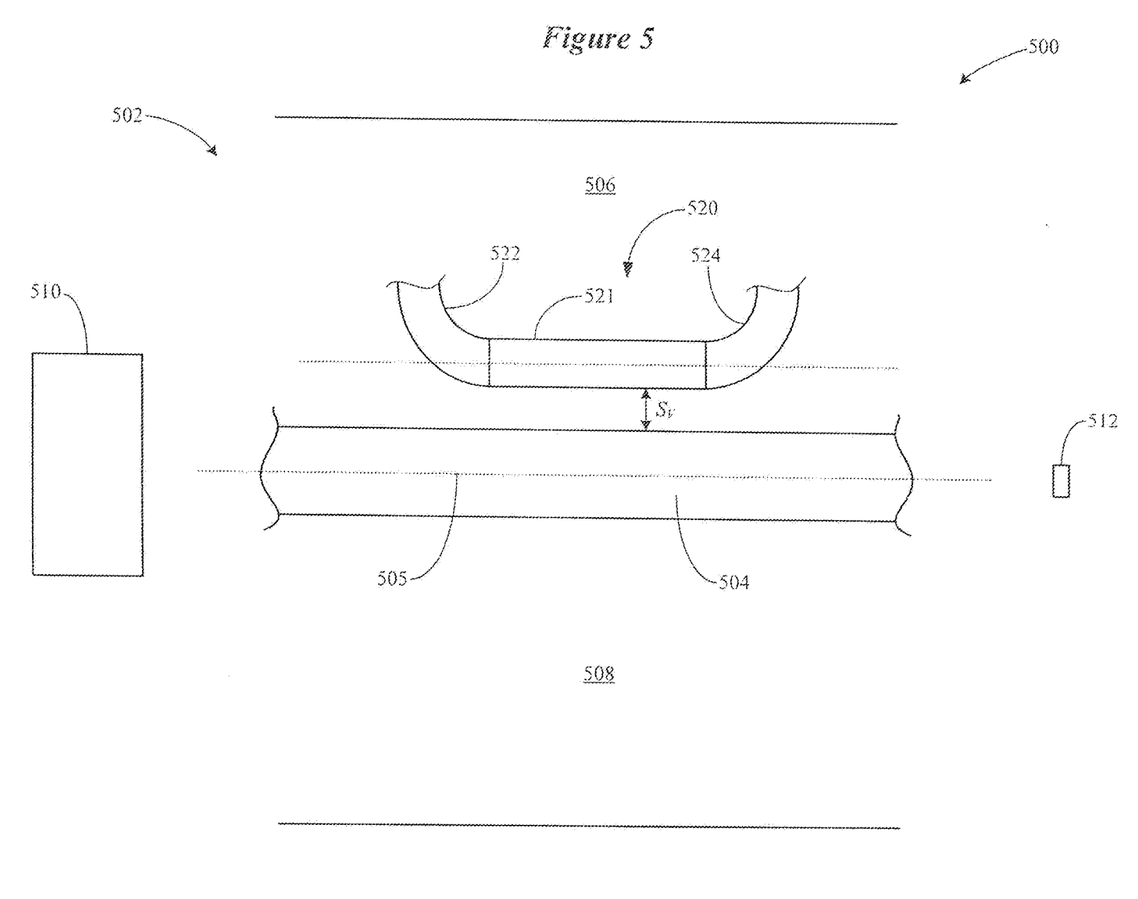
FIG. 5 shows a portion of a HAMR slider that includes a bolometer situated near or within an optical waveguide in accordance with various embodiments.

FIG. 5 shows a portion of a HAMR slider 500 that includes a bolometer 520 situated near or within an optical waveguide 502 in accordance with various embodiments. The waveguide 502 includes a core 504 disposed between cladding layers 506 and 508. The waveguide 502 extends between a laser source 510 and an NFT 512 positioned at the ABS of the slider 500. The bolometer 520 comprises a sensor 521 (active sensing element of the bolometer 520) having a first end and a second end. A first lead 522 is connected to the first end of the sensor 521. A second lead 524 is connected to the second end of the sensor 521. The sensor 521 can be formed from one of NiFe, Rh, Pt, and Ir. The first and second leads 522 and 524 can be formed from Cu or Au. The sensor 521 together with the first and second leads 522 and 524 define a bolometer arrangement having a shape similar to that of a canoe or a kayak.

According to some embodiments, the leading surfaces of the first lead 522 (facing the laser source 510) can be curved to reduce reflection. The trailing surfaces of the second lead 524 can similarly be curved. In the embodiment shown in FIG. 5, at least the sensor 521 has a longitudinal axis that is oriented substantially parallel to the longitudinal axis 505 of the core 504. Preferably, the sensor 521, first lead 522, and second lead 524 are arranged so as not to extend across the width of the core 504. As is shown in FIG. 5, the sensor 521 of the bolometer 520 is spaced apart from the core 504 by a vertical spacing, $S_V$. The sensor 521 can have a length between about 1.5 and 7 μm. As was previously discussed, the vertical spacing, $S_V$, can range between about 100 and 300 nm. Although not shown in FIG. 5, the sensor 521 can be offset horizontally (e.g., 0-500 nm).

Figure 6:
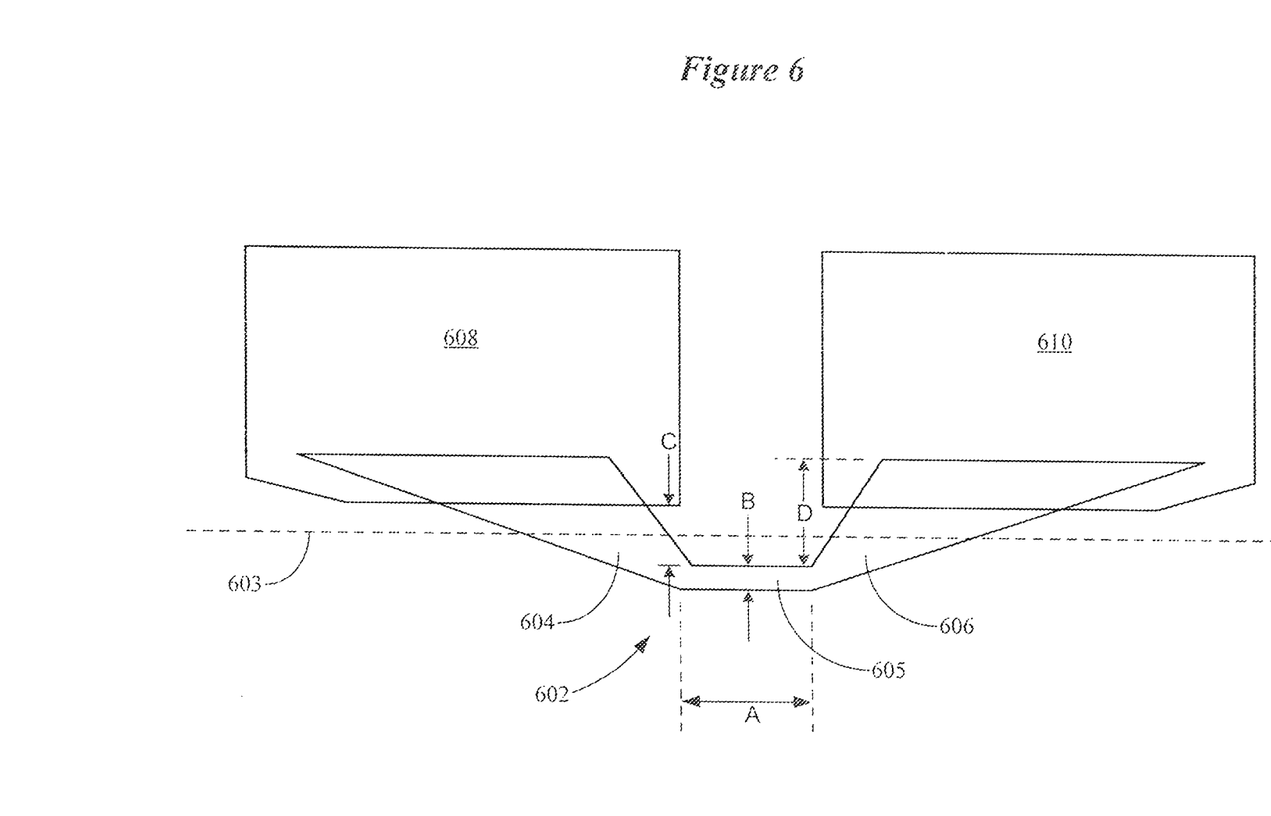
FIG. 6 illustrates a bolometer that provides for low scattering in accordance with various embodiments.

FIG. 6 illustrates a bolometer 602 that provides for low scattering in accordance with various embodiments. The bolometer 602 includes a sensor 605 connected to a first lead 604 and a second lead 606. The first and second leads 604 and 606 are configured as wings, and the overall shape of the bolometer 602 is in the form of a gullwing. The first lead 604 of the bolometer 602 is connected to a first contact 608. The second lead 606 of the bolometer 606 is connected to a second contact 610. The first and second contacts 608 and 610 are configured to couple directly or indirectly (e.g., via traces) to electrical bond pads of a HAMR slider (one of which may be a ground pad). The bolometer 602 (and optionally the first and second contact 608 and 610) has a longitudinal axis 603 that can be oriented substantially parallel to a longitudinal axis of a waveguide core when implemented in a HAMR waveguide. For purposes of illustration and not of limitation, the sensor 605 can have a length of about 1.5 μm and a width of about 0.215 μm. The spacing dimensions C and D between the sensor 605 and the first and second contact 608 and 610 can be about 0.5 μm and 1.0 μm, respectively.

Figure 7:
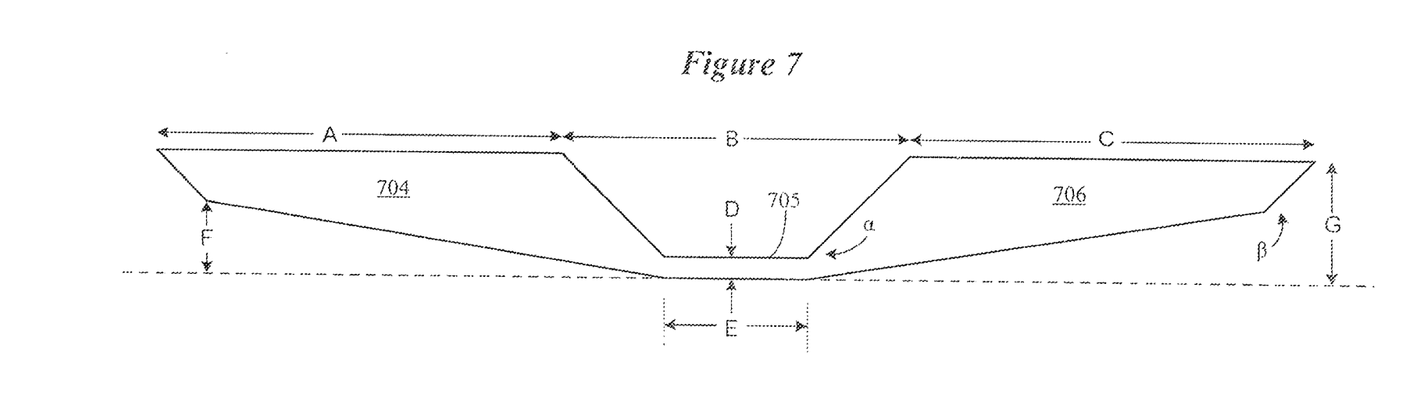
FIG. 7 illustrates a bolometer that provides for low scattering in accordance with some embodiments.

FIG. 7 illustrates a bolometer 702 that provides for low scattering in accordance with various embodiments. The bolometer 702 includes a sensor 705 having a first end coupled to a first lead 704 and a second end coupled to a second lead 706. The first and second leads 704 and 706 are configured as wings, and the bolometer 702 has an overall gullwing shape. For purposes of illustration, the bolometer 702 can have the following dimensions and angles: A=4 μm, B=3.5 μm, C=4 μm, D=0.215 μm, E=1.5 μm, F=0.715 μm, G=1.215 μm, α=45°, and β=45°.

Figure 8:
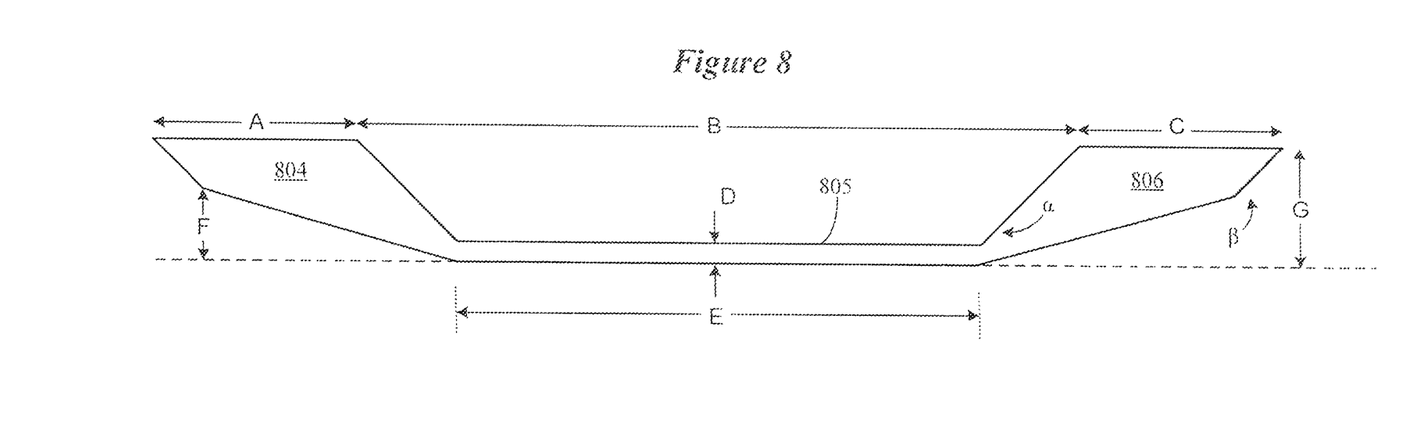
FIG. 8 illustrates a bolometer that provides for low scattering in accordance with other embodiments.

FIG. 8 illustrates a bolometer 802 that provides for low scattering in accordance with various embodiments. The bolometer 802 includes a sensor 805 having a first end coupled to a first lead 804 and a second end coupled to a second lead 806. The first and second leads 804 and 806 are configured as wings, and the bolometer 802 has an overall gullwing shape. For purposes of illustrations, the bolometer 802 can have the following dimensions and angles: A=4 μm, B=8.71 μm, C=4 μm, D=0.215 μm, E=6.71 μm, F=0.715 μm, G=1.215 μm, α=45°, and β=45°.

Figure 9:
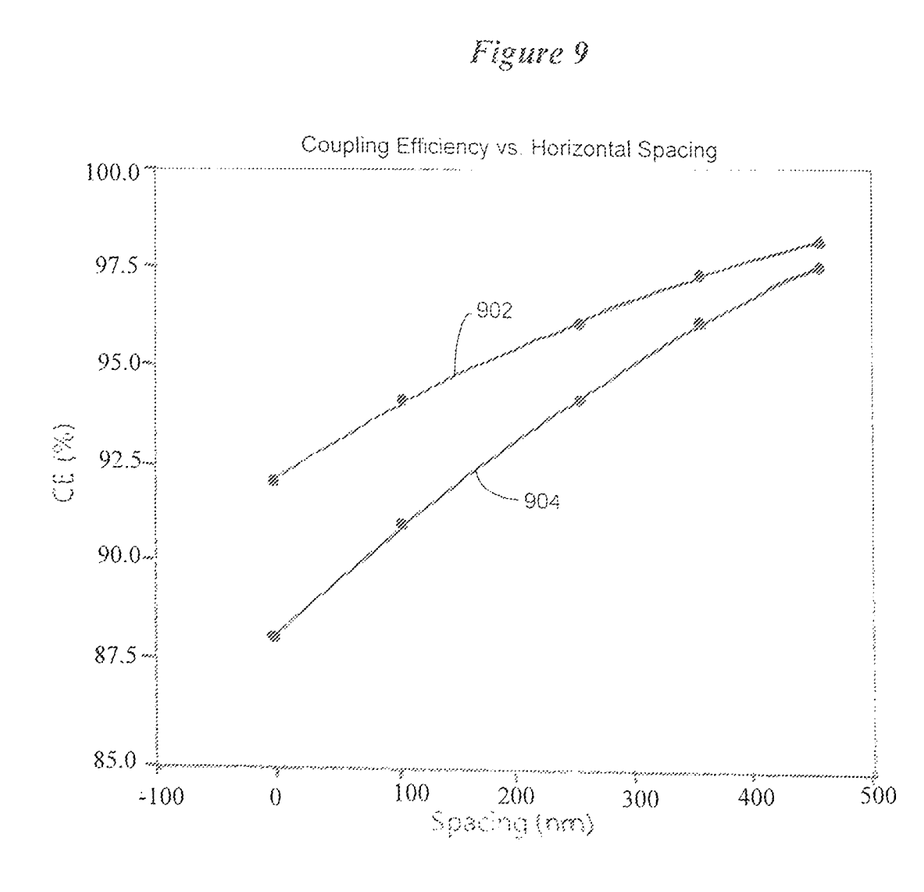
FIG. 9 is a graph showing coupling efficiency (%) of a bolometer versus horizontal spacing (nm) of the bolometer relative to a core of a HAMR waveguide in accordance with various embodiments.

FIG. 9 is a graph developed from modeling showing coupling efficiency (%) of a bolometer versus horizontal spacing (nm) of the bolometer relative to the core of a HAMR waveguide. For curve 902, the vertical spacing above the core was held constant at 76 nm. For curve 904, the vertical spacing above the core was held constant at 121 nm. Curves 902 and 904 demonstrate that coupling efficiency of the bolometer increase with increasing horizontal spacing. Conversely, coupling efficiency of the bolometer decreases with decreasing horizontal spacing. It is noted that changing the vertical spacing in addition to the horizontal spacing can facilitate tuning of the bolometer's coupling efficiency.

Figure 10:
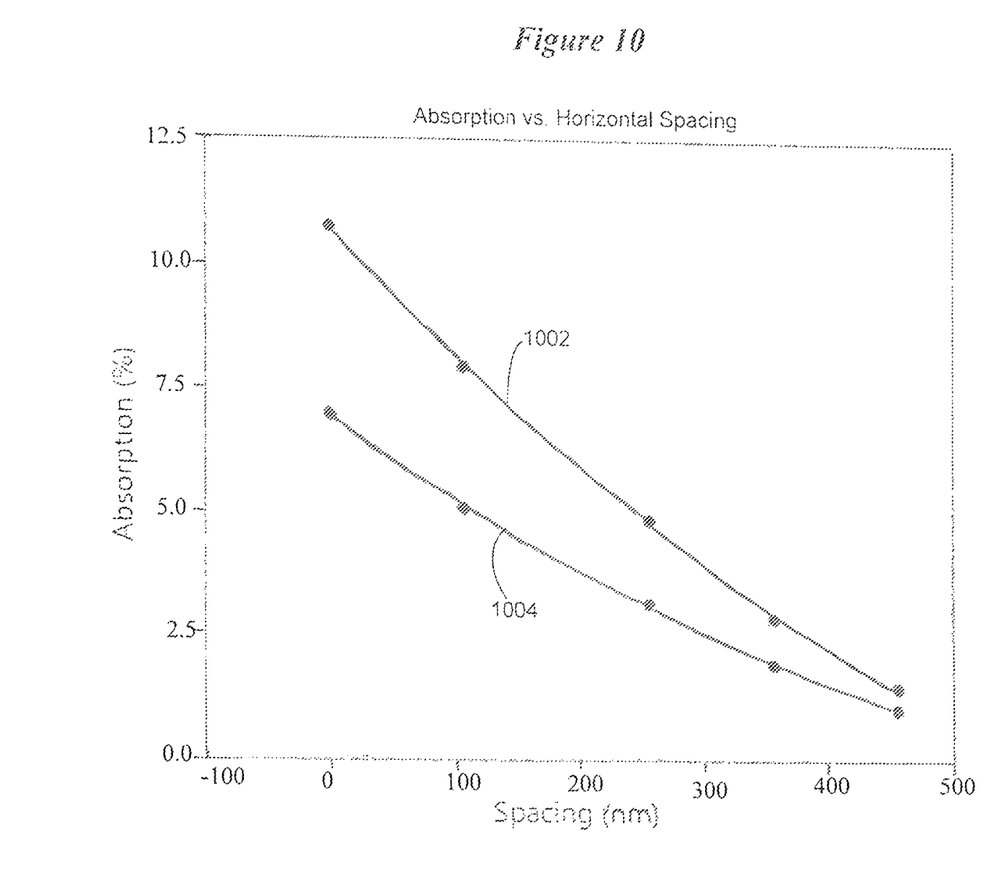
FIG. 10 is a graph showing absorption (%) of a bolometer versus horizontal spacing (nm) of the bolometer relative to a core of a HAMR waveguide in accordance with various embodiments.

FIG. 10 is a graph developed from modeling showing absorption (%) of a bolometer versus horizontal spacing (nm) of the bolometer relative to the core of a HAMR waveguide. For curve 1002, the vertical spacing above the core was held constant at 76 nm. For curve 1004, the vertical spacing above the core was held constant at 121 nm. Curves 1002 and 1004 demonstrate that absorption of the bolometer decreases with increasing horizontal spacing. Conversely, absorption of the bolometer increases with decreasing horizontal spacing. It is noted that changing the vertical spacing in addition to the horizontal spacing can facilitate tuning of the bolometer's absorption efficiency.

Figure 11:
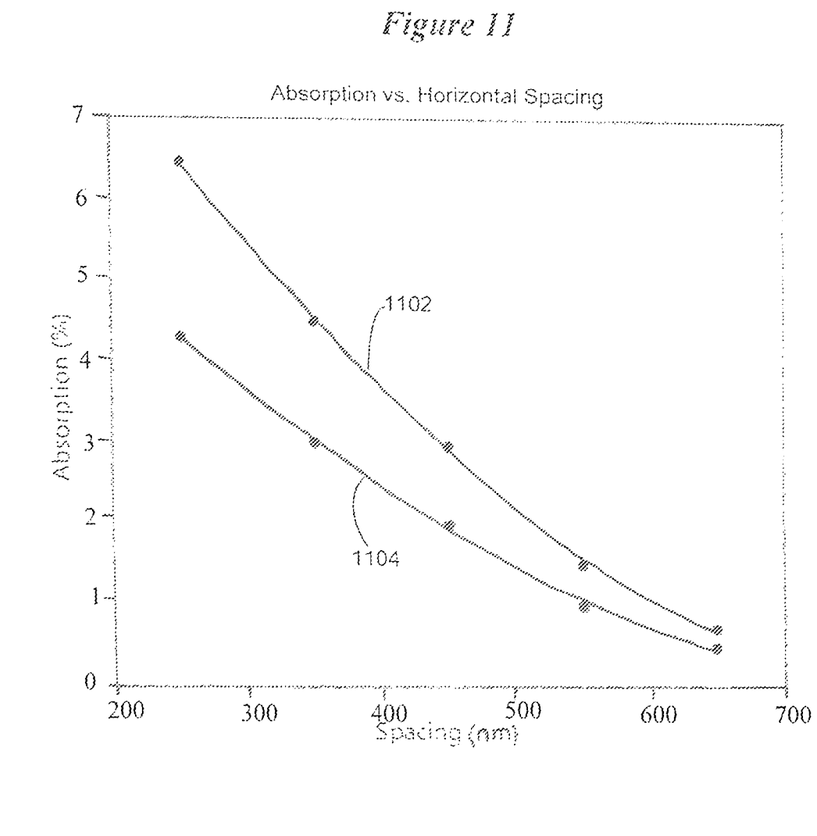
FIG. 11 is a graph showing absorption (%) of a bolometer versus horizontal spacing (nm) of the bolometer relative to a core of a HAMR waveguide in accordance with various embodiments.

FIG. 11 is a graph developed from modeling showing absorption (%) of a bolometer versus horizontal spacing (nm) of the bolometer relative to the core of a HAMR waveguide. For curve 1102, the vertical spacing above the core was held constant at 76 nm. For curve 1104, the vertical spacing above the core was held constant at 121 nm. Curves 1102 and 1104 demonstrate that absorption of the bolometer decreases with increasing horizontal spacing. Conversely, absorption of the bolometer increases with decreasing horizontal spacing. It is noted that changing the vertical spacing in addition to the horizontal spacing can facilitate tuning of the bolometer's absorption efficiency.

Figure 12:
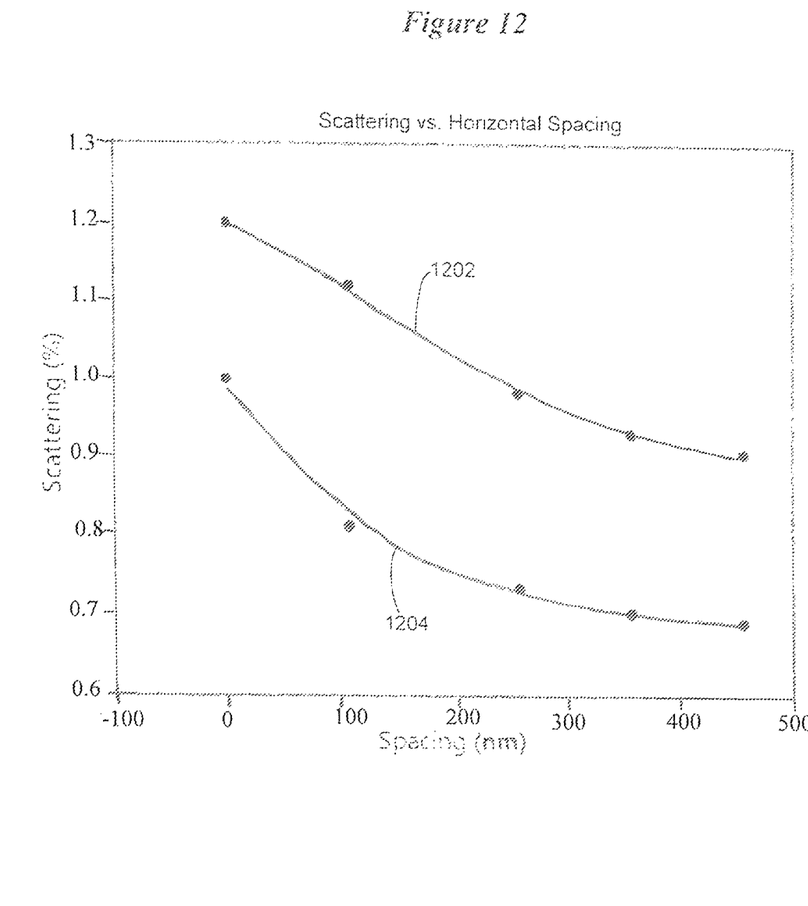
FIG. 12 is a graph showing scattering (%) of a bolometer versus horizontal spacing (nm) of the bolometer relative to a core of a HAMR waveguide in accordance with various embodiments.

FIG. 12 is a graph developed from modeling showing scattering (%) of a bolometer versus horizontal spacing (nm) of the bolometer relative to the core of a HAMR waveguide. For curve 1202, the vertical spacing above the core was held constant at 76 nm. For curve 1204, the vertical spacing above the core was held constant at 121 nm. Curves 1202 and 1204 demonstrate that scattering by the bolometer decreases with increasing horizontal spacing. Conversely, scattering by the bolometer increases with decreasing horizontal spacing. It is noted that changing the vertical spacing in addition to the horizontal spacing can facilitate tuning of the bolometer's scattering characteristics.

Figure 13:
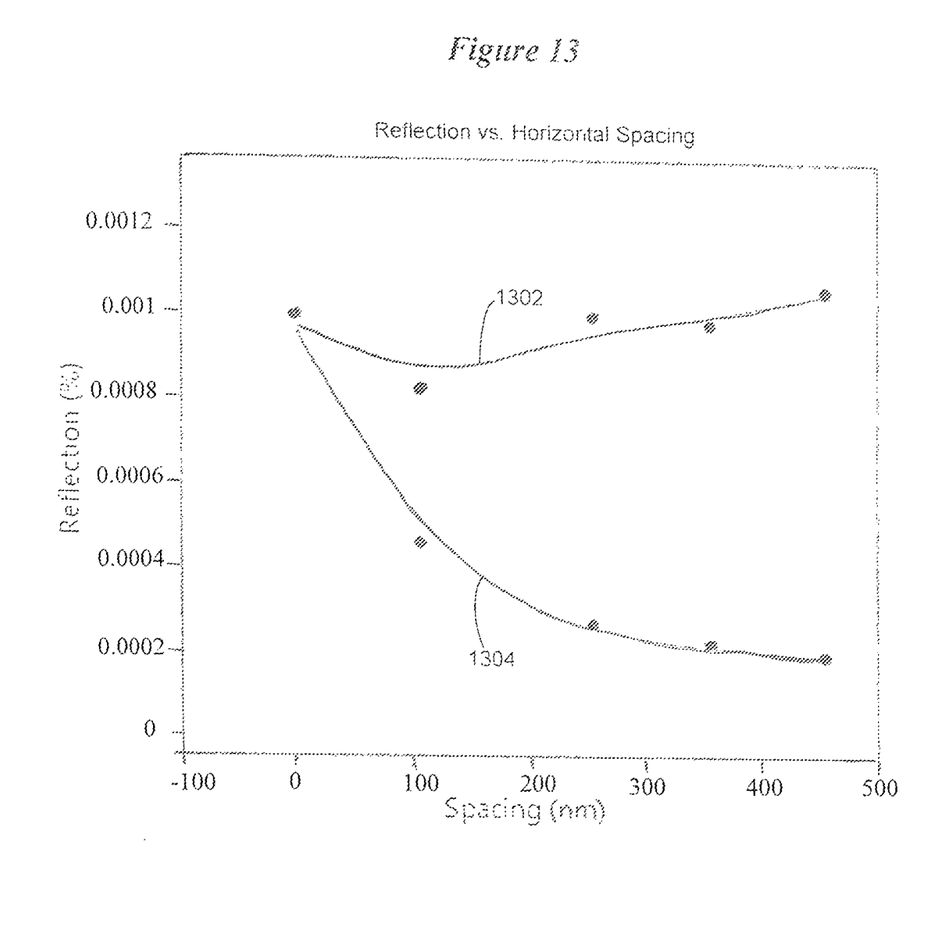
FIG. 13 is a graph showing reflection (%) of a bolometer versus horizontal spacing (nm) of the bolometer relative to a core of a HAMR waveguide in accordance with various embodiments.

FIG. 13 is a graph developed from modeling showing reflection (%) of a bolometer versus horizontal spacing (nm) of the bolometer relative to the core of a HAMR waveguide. For curve 1302, the vertical spacing above the core was held constant at 76 nm. For curve 1304, the vertical spacing above the core was held constant at 121 nm. Curves 1302 and 1304 demonstrate that reflection by the bolometer decreases with increasing horizontal spacing. Conversely, reflection by the bolometer increases with decreasing horizontal spacing. The modeling revealed that reflection was on the order of $10^{-5}$, which is extremely small and will not lead to any laser instability by the bolometer. It is noted that changing the vertical spacing in addition to the horizontal spacing can facilitate tuning of the bolometer's reflection characteristics.

Figure 14:
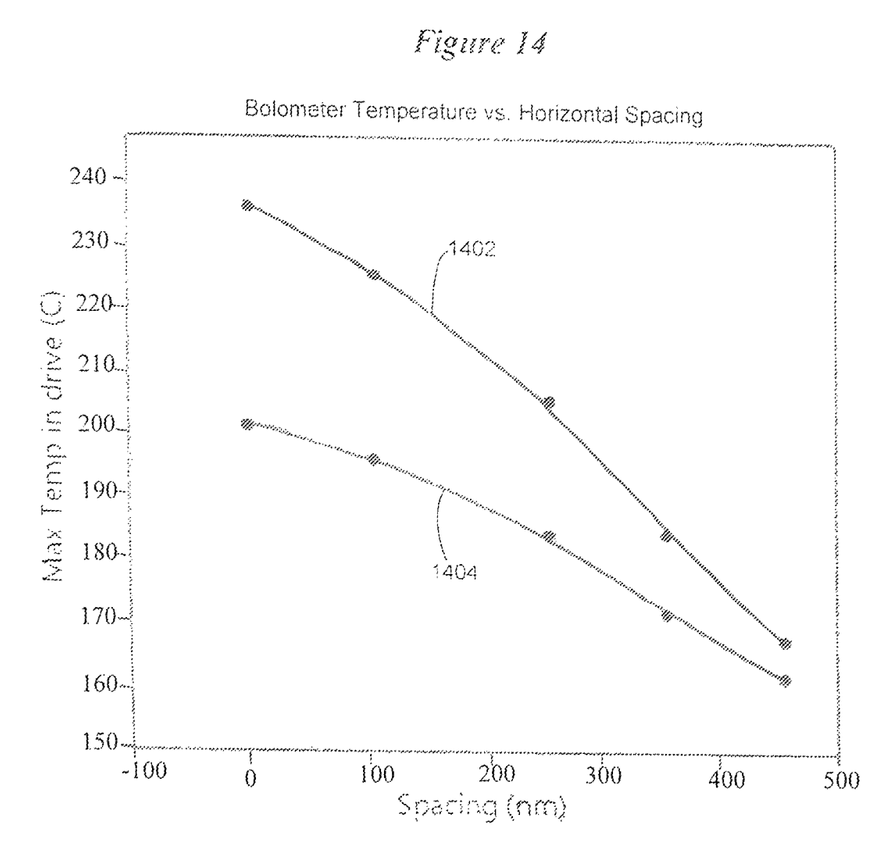
FIG. 14 is a graph showing maximum bolometer temperature (in degrees Celsius) in a hard disk drive versus horizontal spacing (nm) of a bolometer relative to the core of a HAMR waveguide in accordance with various embodiments.

FIG. 14 is a graph developed from modeling showing maximum bolometer temperature (in degrees Celsius) in a hard disk drive versus horizontal spacing (nm) of a bolometer relative to the core of a HAMR waveguide. The y-axis label "maximum temperature in drive" refers to the bolometer having a temperature starting point of 60° C. For curve 1402, the vertical spacing above the core was held constant at 76 nm. For curve 1404, the vertical spacing above the core was held constant at 121 nm. Curves 1402 and 1404 demonstrate that the maximum bolometer temperature decreases with increasing horizontal spacing. Conversely, the maximum bolometer temperature increases with decreasing horizontal spacing. It is noted that changing the vertical spacing in addition to the horizontal spacing can facilitate tuning of the bolometer's maximum temperature. It was found that 330° C. is likely the upper maximum temperature limit for a bolometer sensor formed from NiFe buried in alumina (AlOx).

The modeling showed that the sensor portion of the bolometer (e.g., sensor 605 in FIG. 6) is much hotter than the winged lead portions (e.g., leads 606 and 608 in FIG. 6), which is consistent with the absorption data shown in FIGS. 10 and 11. The modeling also showed that the waveguide core in the vicinity of the bolometer gets hotter relative to other regions of the core. It was found that the waveguide core was typically ~80-100° C. cooler than the bolometer.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
a slider configured for heat-assisted magnetic recording, the slider having an upper surface, an opposing air bearing surface (ABS), and a body defined between the upper surface and the ABS, the slider comprising:
a write pole at or near the ABS;
a near-field transducer (NFT) at or near the ABS and proximate the write pole;
an optical waveguide configured to receive light from a laser source and comprising a first cladding layer, a second cladding layer, and a core between the first and second cladding layers, the core having a width, a length extending between the upper surface of the slider and the NFT, and a longitudinal axis oriented along the length of the core; and
a bolometer comprising a sensor connected to first and second leads and situated within the body of the slider at a location that receives at least some of the light communicated along the waveguide used during a writing operation, the bolometer spaced apart from the core and comprising a longitudinal axis oriented substantially parallel to the longitudinal axis of the core, wherein at least the sensor of the bolometer overlaps with the core.

2. The apparatus of claim 1, wherein the sensor and the first and second leads overlap with the core.

3. The apparatus of claim 1, wherein the sensor and the first and second leads overlap with the core and do not extend across a width of the core.

4. The apparatus of claim 1, wherein:
the core comprises a centerline parallel to the longitudinal axis of the core; and
a longitudinal axis of the sensor is aligned along the centerline of the core.

5. The apparatus of claim 1, wherein the bolometer is offset from the core by:
a horizontal spacing ranging between about 0 and 500 nm; and
a vertical spacing ranging between about 100 and 300 nm.

6. The apparatus of claim 1, wherein the sensor has a length of between about 1.5 and 7 μm.

7. The apparatus of claim 1, wherein:
the waveguide comprises a lower-mode order section proximate the laser source and a higher-mode order section proximate the NFT; and
the bolometer is situated within the lower-mode order section.

8. The apparatus of claim 1, wherein the bolometer is spaced from the laser source by a distance of less than about 60 μm.

9. The apparatus of claim 1, wherein the sensor of the bolometer comprises one of NiFe, Rh, Pt, and Ir.

10. The apparatus of claim 1, wherein the bolometer has a canoe or kayak shape.

11. An apparatus, comprising:
a slider configured for heat-assisted magnetic recording, the slider having an upper surface, an opposing air bearing surface (ABS), and a body defined between the upper surface and the ABS, the slider comprising:
a write pole at or near the ABS;
a near-field transducer (NFT) at or near the ABS and proximate the write pole;
an optical waveguide configured to receive light from a laser source and comprising a first cladding layer, a second cladding layer, and a core between the first and second cladding layers, the core having a width and a length extending between the upper surface of the slider and the NFT; and
a bolometer situated within the body of the slider at a location that receives at least some of the light communicated along the waveguide used during a writing operation, the bolometer comprising:
a sensor having a first end and a second end;
a first lead comprising a curved portion connected to the first end; and
a second lead comprising a curved portion connected to the second end; wherein the sensor and the curved portions of the first and second leads overlap the core and are spaced apart from the core so as not to extend across the width of the core.

12. The apparatus of claim 11, wherein the bolometer comprises a longitudinal axis oriented substantially parallel to a longitudinal axis of the core.

13. The apparatus of claim 11, wherein:
the core comprises a centerline parallel to a longitudinal axis of the core; and
a longitudinal axis of the sensor is aligned along the centerline of the core.

14. The apparatus of claim 11, wherein the bolometer comprises a longitudinal axis oriented at an oblique angle with respect to a longitudinal axis of the core.

15. The apparatus of claim 11, wherein the bolometer is offset from the core by:
a horizontal spacing ranging between about 0 and 500 nm; and
a vertical spacing ranging between about 100 and 300 nm.

16. The apparatus of claim 11, wherein:
the waveguide comprises a lower-mode order section proximate the laser source and a higher-mode order section proximate the NFT; and the bolometer is situated within the lower-mode order section.

17. The apparatus of claim 11, wherein the bolometer is spaced from the laser source by a distance of less than about 60 μm.

18. The apparatus of claim 11, wherein the sensor of the bolometer has a length of between about 1.5 and 7 μm.

19. The apparatus of claim 11, wherein the sensor of the bolometer comprises one of NiFe, Rh, Pt, and Ir.

20. The apparatus of claim 11, wherein the bolometer has a canoe or kayak shape.

* * * * *